United States Patent
Stuhec

(10) Patent No.: US 8,150,883 B2
(45) Date of Patent: Apr. 3, 2012

(54) MANAGING DATA COMPONENT WITH HARMONIZATION INDICATOR

(75) Inventor: Gunther Stuhec, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 1812 days.

(21) Appl. No.: 11/087,918

(22) Filed: Mar. 23, 2005

(65) Prior Publication Data

US 2006/0218175 A1    Sep. 28, 2006

(51) Int. Cl.
*G06F 17/30* (2006.01)
(52) U.S. Cl. ........................................ 707/796
(58) Field of Classification Search ............... 707/796
See application file for complete search history.

(56) References Cited

U.S. PATENT DOCUMENTS

| | | | | |
|---|---|---|---|---|
| 5,717,923 | A * | 2/1998 | Dedrick | 707/102 |
| 6,018,742 | A * | 1/2000 | Herbert, III | 707/102 |
| 6,163,781 | A * | 12/2000 | Wess, Jr. | 707/103 X |
| 6,366,917 | B1 * | 4/2002 | St. John Herbert, III | 707/100 |
| 6,490,695 | B1 * | 12/2002 | Zagorski et al. | 714/38 |
| 6,535,919 | B1 * | 3/2003 | Inoue et al. | 709/229 |
| 6,789,216 | B2 * | 9/2004 | Zagorski et al. | 714/38 |
| 6,985,905 | B2 * | 1/2006 | Prompt et al. | 707/102 |
| 7,127,516 | B2 * | 10/2006 | Inoue et al. | 709/229 |
| 7,181,463 | B2 * | 2/2007 | Moore et al. | 707/102 |
| 2001/0034733 | A1 * | 10/2001 | Prompt et al. | 707/102 |
| 2003/0028857 | A1 * | 2/2003 | Zagorski et al. | 717/124 |
| 2005/0033719 | A1 * | 2/2005 | Tirpak et al. | 707/1 |
| 2005/0278372 | A1 * | 12/2005 | Shaburov et al. | 707/102 |
| 2006/0101068 | A1 * | 5/2006 | Stuhec et al. | 707/103 R |
| 2006/0106746 | A1 * | 5/2006 | Stuhec | 707/1 |
| 2006/0106824 | A1 * | 5/2006 | Stuhec | 707/100 |
| 2006/0136489 | A1 * | 6/2006 | Thome et al. | 707/103 R |

OTHER PUBLICATIONS

Joe Celko, "Joe Celko's SQL for Smarties: Advanced SQL Programming," 2nd Edition, 2000.*

(Continued)

*Primary Examiner* — Hung Q Pham
*Assistant Examiner* — Hubert Cheung
(74) *Attorney, Agent, or Firm* — Fish & Richardson P.C.

(57) ABSTRACT

Data elements for a data component are specified by creating a data type that includes several data elements, the data type to be used in creating data components for specific contexts. Each of the several data elements is associated with a harmonization indicator that causes the associated data element to be included, or not included, in the data components for any of the specific contexts. A method of performing a predefined operation on a data component includes receiving a user input specifying at least one context value for performing a predefined operation on a data component for a specific context characterized by the at least one context value. The predefined operation is performed using a harmonization indicator included in a data type that is context independent. Data components are used in software components or application components.

16 Claims, 11 Drawing Sheets

OTHER PUBLICATIONS

Davis, J., *Context Tailor: Towards a Programming Model for Context-Aware Computing*, International Middleware Conference Workshop Proceedings—Middleware for Pervasive and Ad Hoc Computing, Jun. 16-20, 2003, Rio de Janeiro, Brazil, 68-75, 2003.

Oasis ebXML Registry TC[online], Oasis, 2005 [retrieved on Mar. 23, 2005]. Retrieved from the Internet: <URL: http://www.oasis-open.org/committees/tc_home.php?wg_abbrev=regrep>.

GoXML Registry [online], Xenos, 2002 [retrieved on Mar. 23, 2005]. Retrieved from the Internet: <URL: http://www.xmlglobal.com/solutions/prod_goxml_registry.asp>.

The Company of the Open Standard Solutions [online], ebXMLsoft Inc., 2001-2004 [retrieved on Mar. 23, 2005]. Retrieved from the Internet: <URL: http://www.ebsmlsoft.com/ >.

Project: ebXML Registry/Repository: Summary [online], SourceForge.net, 2005 [retrieved on Mar. 23, 2005]. Retrieved from the Internet: <URL: http://sourceforge.net/projects/ebsmlrr >.

*Core Components Technical Specification V2.01—Part 8 of the ebXML Framework*, United Nations Centre for Trade Facilitation and Electronic Business, pp. 1-113, Nov. 15, 2003.

\* cited by examiner

MANAGING DATA COMPONENT WITH HARMONIZATION INDICATOR

TECHNICAL FIELD

The description relates to a data type that includes data elements associated with respective harmonization indicators, and managing data components that are context specific representations of the data type.

BACKGROUND

Many aspects of electronic communication, and in particular electronic commerce, is based on business documents that parties can exchange over a computer connection. A big problem in current e-Business is the variety in structure and description of business information and business documents. The absence of uniform and standardized methods for the common representation of the structure and semantics of business data has led to today's situation where there is an increasing growth of different representations of electronic business information and documents. It may not be possible to exchange business documents electronically between two business partners without previous coordination and manual mapping between different document structures and semantics. A world-wide accepted syntax for representation exists with extensible markup language (XML), but this does not solve the problem of non-uniform semantics and structure.

Some business documents are based on reusable building blocks that define the semantics of the document data. An example of a standard that defines such building blocks is the electronic business XML (ebXML) Core Components Technical Specification issued by the United Nations Centre for Trade Facilitation and Electronic Business, which specification is hereafter referred to as CCTS. The CCTS is the first standard which combines all necessary aspects for human legibility and automatic machine processing so that an integrated interoperability can be guaranteed. The CCTS based building blocks, named core components (CCs), are syntax free and very flexible, because they are based on a modular concept. Business information can be assembled for all demands by reusable building blocks. "Syntax free" means that these building blocks can be generated in arbitrary representations, like XML, ABAP Objects or JAVA classes. However, the semantics described by the CCTS do not change. This guarantees one general naming convention for the unambiguous composition of semantic information. This mechanism is comparable with the grammar and words of a naturally-spoken language, because a naturally-spoken language can also be represented in many different ways (by writing or by speech), and the semantics are always the same.

In every business collaboration that involves data exchange, such data exists in a particular business context. The context of one transaction may be the same as, or different from, the context of any other transaction. The CCTS specifies eight context categories for defining the business context: Business Process, Product Classification, Industry Classification, Geopolitical, Official Constraints, Business Process Role, Supporting Role and System Capabilities. These categories are to be used in analyzing business information entities (BIEs) that are based on CCs. Each of the CCTS context categories uses a standard classification to provide (context) values.

SUMMARY

The invention relates to managing a data component using a harmonization indicator.

In a first general aspect, the invention provides a method of specifying data elements for a data component. The method comprises creating a data type that includes several data elements, the data type to be context independent and to be used in creating data components for specific contexts. The method comprises associating each of the several data elements with a harmonization indicator that, when set, causes the associated data element to be included in the data components for any of the specific contexts unless explicitly excluded, and that, when not set, causes the associated data element not to be included in the data components for any of the specific contexts unless explicitly included.

There may be received user input to explicitly exclude, from at least one of the specific contexts, at least one of the data elements whose harmonization indicator is set. As another example, there may be received user input to explicitly include, for at least one of the specific contexts, at least one of the data elements whose harmonization indicator is not set.

In selected implementations, there is set a cardinality for at least one of the several data elements. Where the harmonization indicator for the at least one data element is set, there may be created, for the at least one data element, an extension element for which the harmonization indicator is not set. Where the cardinality specifies that the at least one data element is optional, the extension element may be specified as mandatory in at least one of the specific contexts.

In selected implementations, the data elements and the specific contexts are CCTS-based.

In a second general aspect, the invention provides a method of performing a predefined operation on a data component for a specific context. The method comprises receiving a user input specifying at least one context value. The user input is made for performing a predefined operation on a data component for a specific context characterized by the at least one context value. The data component is a context specific representation of a context independent data type. The method comprises reading data elements of the data type in response to the user input. Each of the data elements is associated with a harmonization indicator that, when set, causes the associated data element to be included in performing the predefined operation unless the data type explicitly excludes the associated data element for the specific context, and that, when not set, causes the associated data element not to be included in performing the predefined operation unless the data type explicitly includes the associated data element for the specific context.

In selected implementations, the predefined operation comprises creating the data component for inclusion in a software component for the specific context. The software component may include at least one application component, and the data component may be modified to be included in the at least one application component. A name for the data component may be assigned based on the data type. The name may be assigned taking into account a name space of the software component. The data component may be stored in a searchable repository of several data components, and an editing module may be provided for a user to create an edited data component from any of the several data components, the edited data component being permitted only in a context in which it is created. The editing module may identify to the user the context in which the edited data component is created. The editing module may display to the user a context-specificity icon associated with at least one data element in the data component being edited, the context-specificity icon indicating whether the data element is included in all contexts. The edited data component may be formed by adding to the at least one data component a new data element that the data type does not contain. Another data component that includes the new data element and that is created in a different context than the edited data component may be identified to aid a decision whether to harmonize the new data element. Where the data component to be created already exists in another context, the at least one context value specified in the user input may be added to the existing data component. The predefined operation may comprise deleting the data component for the specific context. Where the data component to be deleted already has been deleted in another context, the at least one context value specified in the user input may be added to the already deleted data component.

Advantages of the systems and techniques described herein may include any or all of the following: Providing that an applicable BIE is identified based on the context input by a user; providing a harmonization indicator that simplifies creation of data components from a data type; providing that an explicit inclusion or exclusion of a data element supersedes the setting or non-setting of the harmonization indicator for a specific context; providing, as a mandatory extension for a specific context, an unharmonized version of a harmonized element that is optional in all contexts; providing context-specific editing of a data component; providing a convenient method of distinguishing between components that can be used in all contexts and context specific components; and comparing edits of data components made in different contexts and using the comparison to aid a decision whether to harmonize data elements.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
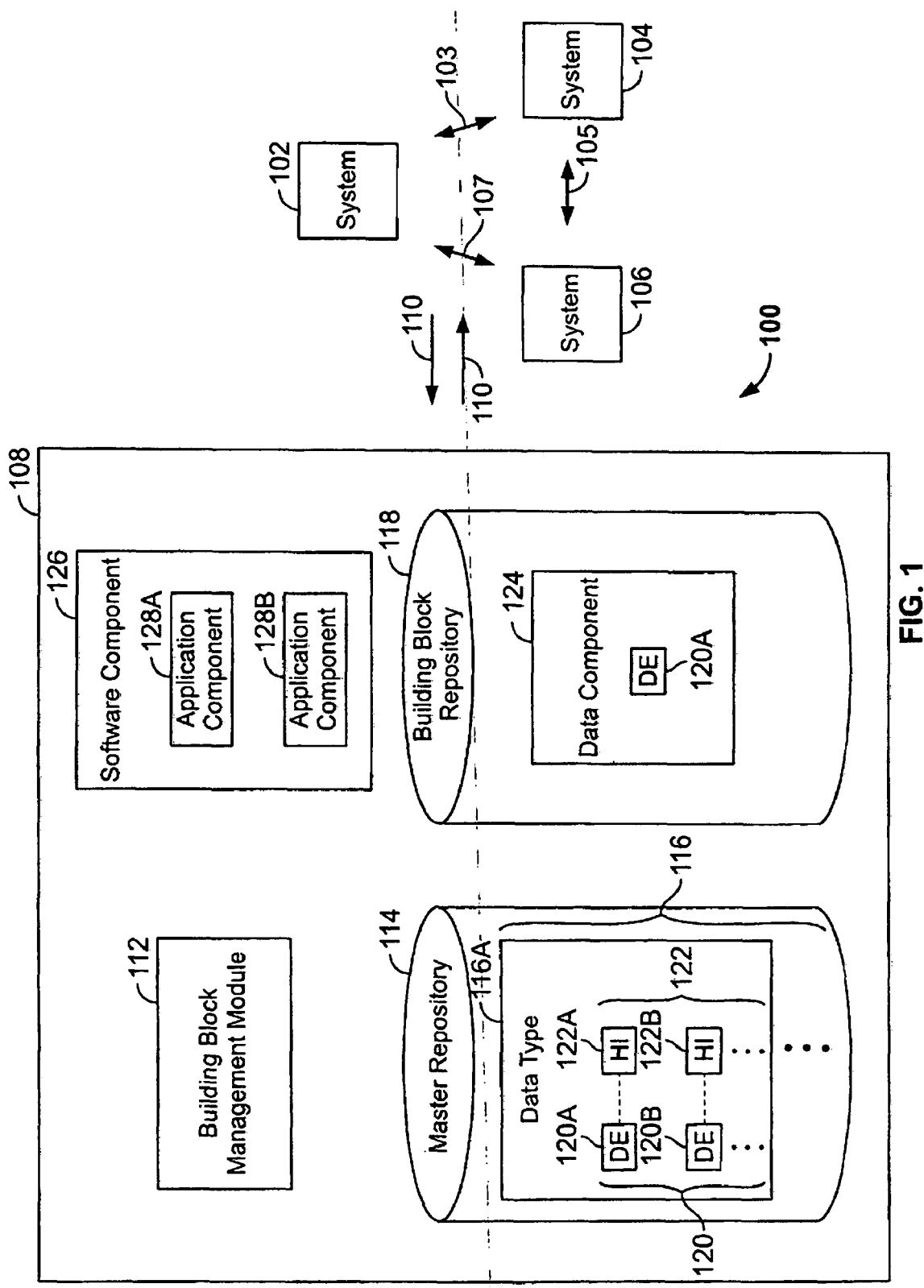
FIG. 1 is a block diagram that illustrates management of a data component for a specific context.

FIG. 1 schematically shows an environment 100 for managing and using context specific components created from data types. The data components can be used in electronic communications between actors, for example actors that use computer systems 102, 104 and 106. The first system 102 may be operated by an automotive manufacturer, the second system 104 by an insurance company, and the third system 106 by a financial institution. The systems are connected using any conventional computer network, such as the internet, so that any two of these actors can electronically communicate with each other using business communication protocols.

The transactions between the actors take place in specific contexts depending on which actors are involved. Communication between the first and second systems may take place in a first context 103. In this example, the first context may be referred to as an "insurance" context because the manufacturer is insured by the insurance company. Communication between the second and third systems may take place in a second context 105. Here, the second context may be referred to as a "financial services" context because the financial institution provides financial services for the insurance company. Communication between the first system and the third system may take place in a third context 107. Here, the third context may be referred to as a "banking" context because the financial institution handles banking business for the manufacturer.

Any of the systems 102, 104 or 106 may access specific information and services available in a computer system 108, to be described below, for participating in the electronic communication with any other actor. Such access may take place over the computer network and is schematically illustrated by arrows 110. For example, the system 108 may be part of a translation system that any actor uses to convert received business information from one business communication protocol, or schema, to another. In other embodiments, one or more of the actors' main systems (102-106) may include the some or all components of the system 108.

The system 108 includes a building block management module (BBMM) that manages the use of building blocks, including creating, modifying and deleting specific data components from a data type. The system 108 includes a master repository 114 that includes one or more data types 116. The data types are context independent and the data components are context specific representations thereof. The created data component(s) may be stored in a building block repository 118. The repositories 114 and 118 may be separate or joined.

The data types 116 include at least one data element (DE) 120. Here, a first data type 116A includes at least a first data element 120A and a second data element 120B. For example, the first data type 116A may relate to exchange of account information and the data elements may pertain to the account number and the account holder's name, respectively.

Any data element in a data type may or may not be relevant for use in every specific context. Upon creating a data component from the data type 116A, it is therefore determined which of the data elements 120 should be included. This determination is aided by harmonization indicators (HI) 122 with which the respective data elements are associated. For example, the first data element is associated to a first HI 122A and the second data element is associated with a second HI 122B. The HI is capable of assuming at least the states of being set or not set. When set, a HI causes the associated data element to be included in data components for any of the specific contexts unless explicitly excluded. When not set, the HI causes the associated data element not to be included in data components for any of the specific contexts unless explicitly included.

Assume that a data component 124 is to be created from the data type 116A for a specific context. In this example, the HI 122A has been set and the HI 122B has not been set. The state of the data element 120A (which is associated with the set HI 122A) is therefore referred to as being "harmonized" and the state of the data element 120B (which is associated with the unset HI 122B) is "non-harmonized." Here, there has been no explicit exclusion of the harmonized data element 120A and there has been no explicit inclusion of the non-harmonized data element 120B. Accordingly, the created data component 124 includes the data element 120A and does not include the data element 120B. The data component is valid in the context(s) for which it is created. Over time, many different data components, relating to a variety of contexts, may be stored in the building block repository.

The data components may be created for inclusion in one or more software components 126, such as a customer relationship management (CRM) system. Any software component may include one or more application components 128A and 128B that are industry-specific subsets of the software component. For example, the application component 128A may be part of a consumer products CRM system and the component 128B may be part of a chemical manufacturing CRM system.

Figure 2:
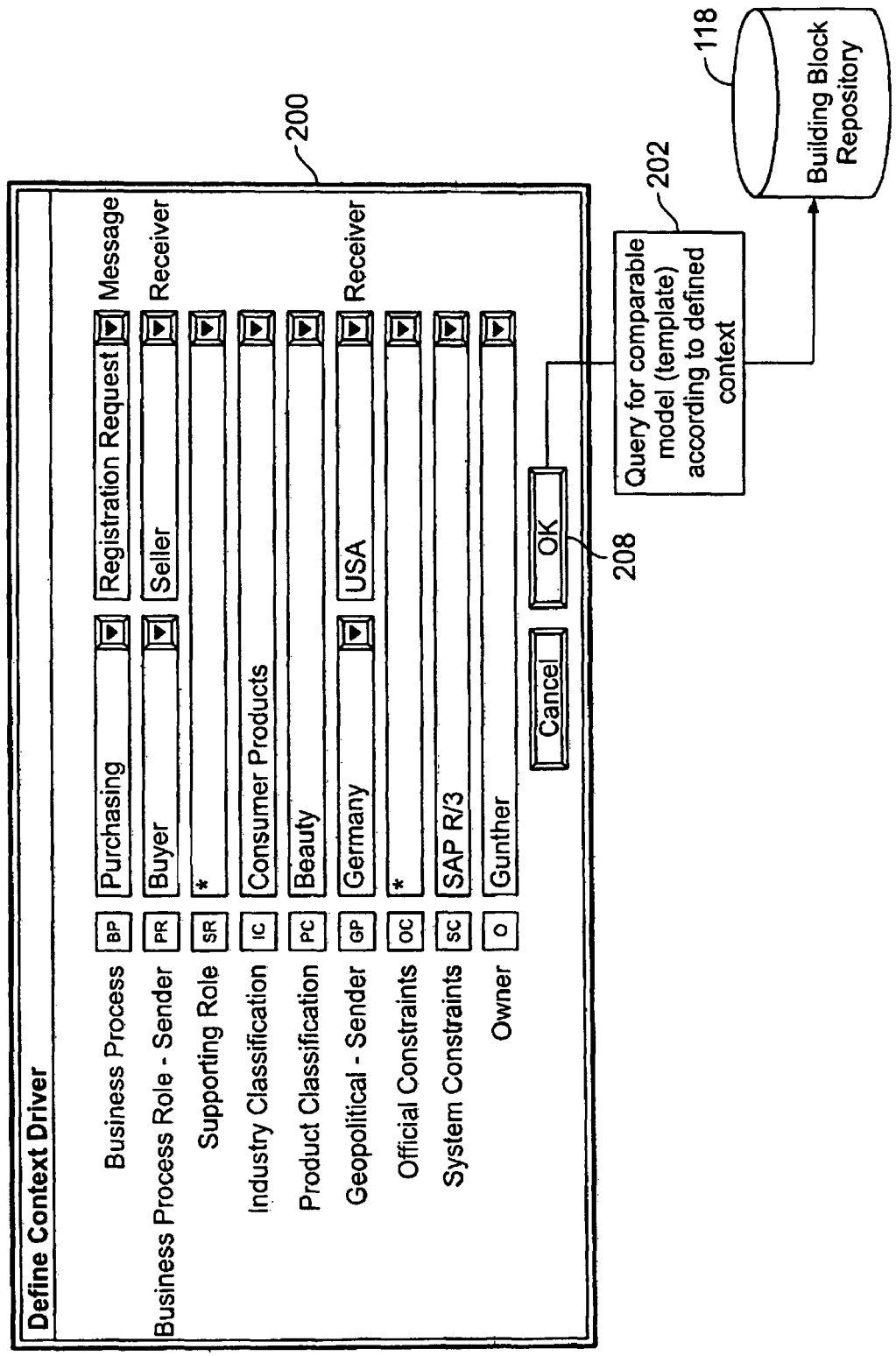
FIG. 2 schematically illustrates identification of a model of building blocks based on user-input context values.

The system 108 may provide searching among the data components in the building block repository for one or more purposes. FIG. 2 shows an example of a graphical user interface (GUI) 200 generated by the BBMM 112 that can be used for such searching. The GUI 200 can be used when the user wants to create (or identify) a data component for a specific context, as well as for modifying, extending or deleting the component for the specific context.

The GUI 200 has input areas where the user can enter one or more context values. Upon initiation of the query, the entered value(s) will be used to search the building block repository for a model that matches the defined context. If there is a match, the identified model may be used as a template in modeling. Here, input areas 204 relate to the eight CCTS context categories. There is also an input area Owner 206 that lets the user specify the owner of the sought model(s). In some of the input areas, more than one input field is used for each category.

In this example, the user seeks a model for a registration request to be used in the purchasing context. Moreover, the registration request is to be sent from a German buyer to an American seller of beauty products. The actors use the SAP R/3 system for handling the business communication. The user therefore enters context values for this specific context in the GUI 200. A Business Process input area 204A includes separate input fields (drop-down list boxes) for the Business Process itself (entered value: Purchasing) and a Message field (entered value: Registration Request). A Business Process Role area 204B includes separate fields for specifying the Sender (entered value: Buyer) and the Receiver (entered value: Seller). The single field of a Supporting Role area 204C currently has a wildcard character ("*"). The user enters Consumer Products in an Industry Classification area 204D and Beauty in a Product Classification area 204E. In Sender and Receiver fields of a Geopolitical area 204F the user enters Germany and USA, respectively. The user enters the wildcard character in an Official Constraints area 204G, and SAP R/3 in a System Constraints area 204H. In the Owner area 206 the user enters Gunther as a restriction on the model owner. Upon the user selecting an OK button 208, the query 202 of the building block repository is initiated.

Figure 3:
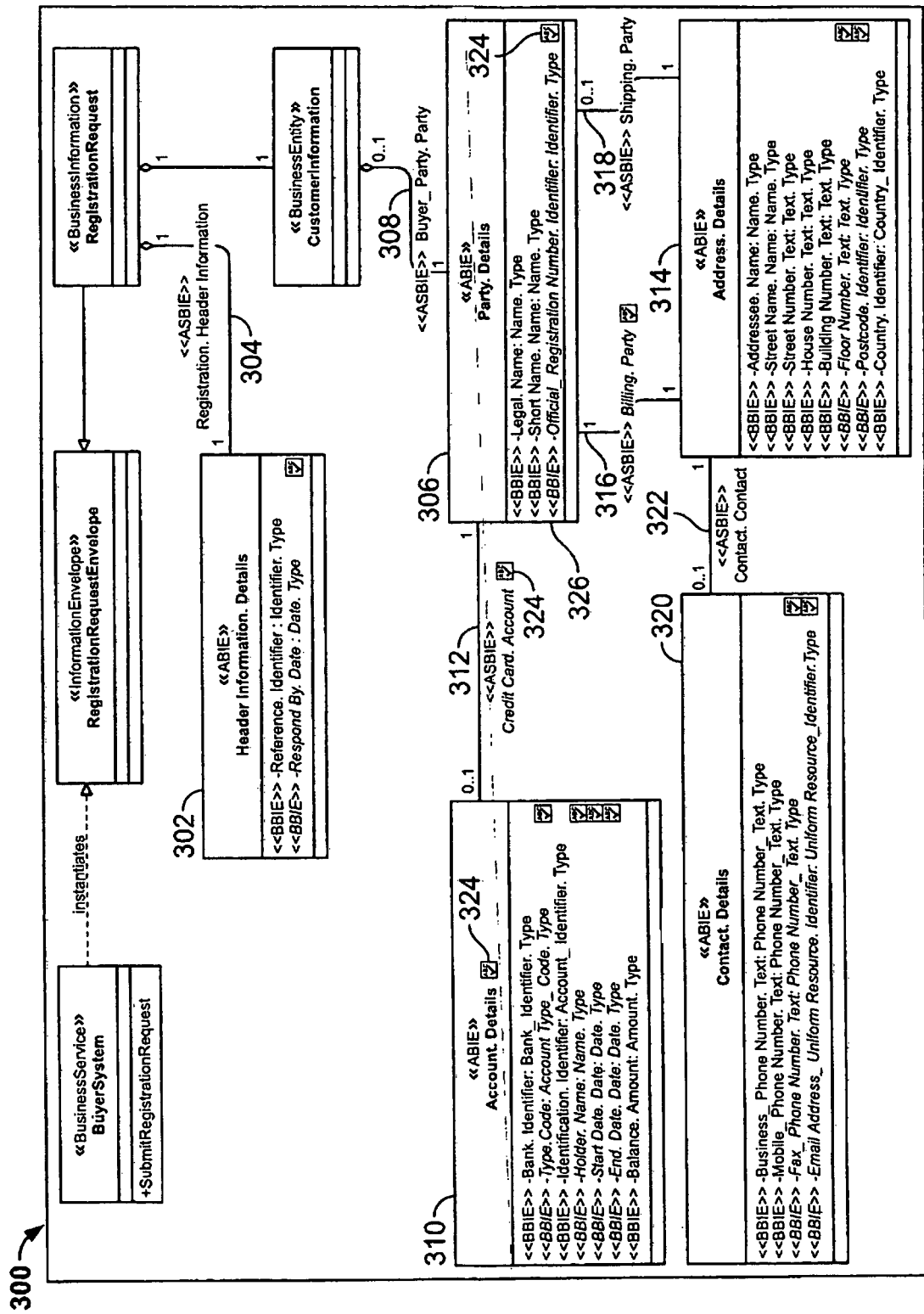
FIG. 3 shows an example of a model that can be identified using the FIG. 2 example.

FIG. 3 shows an example of a model 300 resulting from this search. The model 300 represents the complete form of a specific business document. That is, the model contains all components and entities that can occur in all contexts, or only in some contexts.

Here, the components of the model 300 are CCTS-based and include basic BIEs (BBIEs), aggregate BIEs (ABIEs) and association BIEs (ASBIEs) as defined by that standard. For example, the model 300 includes an ABIE 302 associated by an ASBIE 304, an ABIE 306 associated by an ASBIE 308, an ABIE 310 associated to the ABIE 306 by an ASBIE 312, an ABIE 314 associated to the ABIE 306 by ASBIEs 316 and 318, and an ABIE 320 associated to the ABIE 314 by an ASBIE 322. Each of the ABIEs includes one or more BBIEs.

Any of the ABIEs or the ASBIEs, or any element of an ABIE, may be provided with a context-specificity icon 324. The icon 324 indicates that the entity can be used only in a specific context. For example, the ABIE 310 has the icon 324, as does the ASBIE 312. The ABIE 306, in contrast, does not have the icon 324, which indicates that this ABIE can be used in all contexts. However, a BBIE 326 included in this all-contexts ABIE is provided with the icon 324 because this element is only usable in a specific context.

Figure 4:
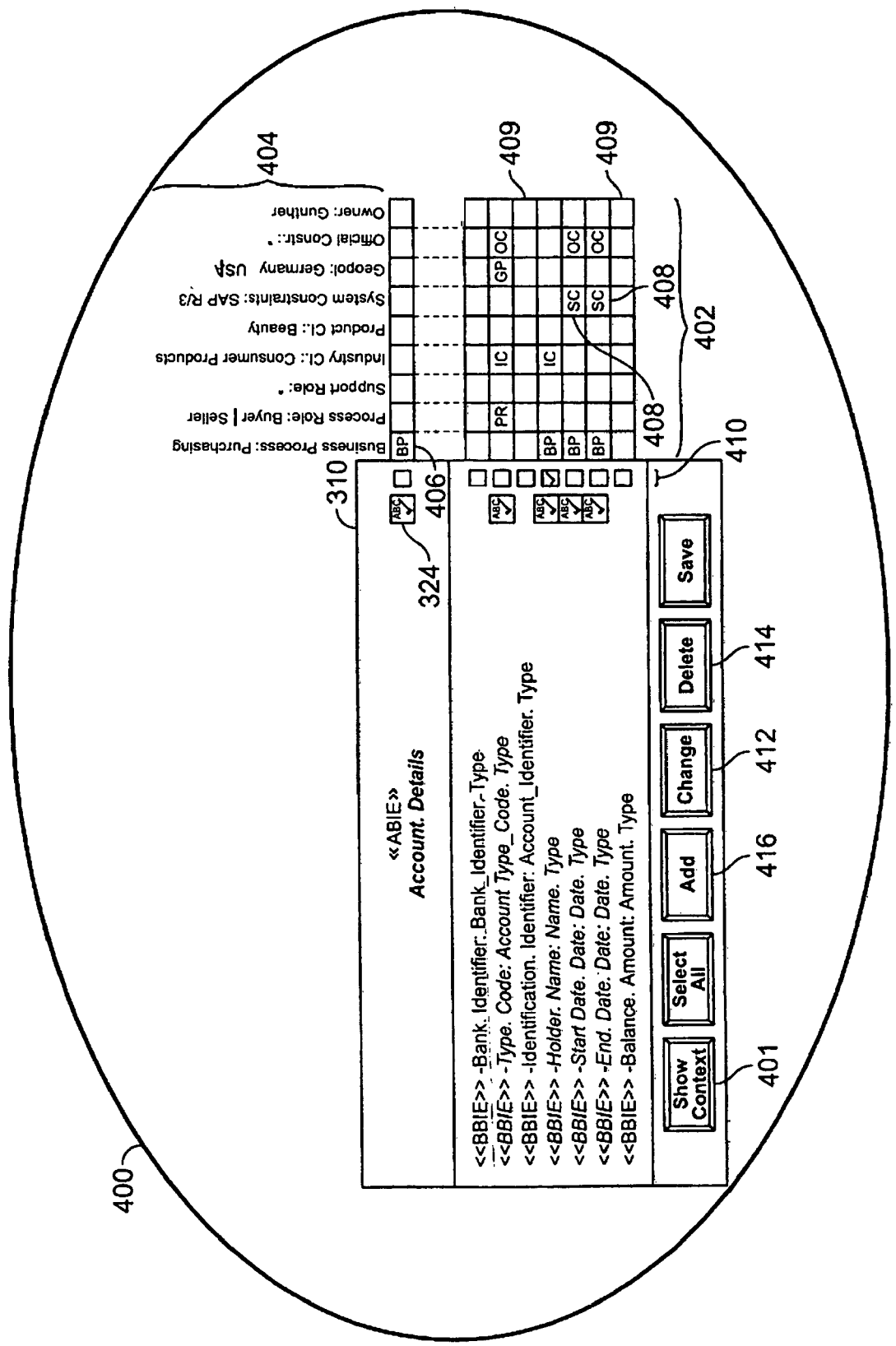
FIG. 4 schematically illustrates editing of a data component of the FIG. 3 search result.

A user that initiated the query may analyze the contents of the model 300 to determine whether they are appropriate and sufficient for the user's needs. Moreover, the user can edit the model 300 to add or remove specific features. FIG. 4 shows an editing module 400 that the user can initiate. The editing module displays any selected portion of the model 300. Here, the user has chosen to edit the ABIE 310 which relates to the details of each specific party's account, such as bank identifier, account type and balance.

Upon the user selecting a Show Context control 401, the editing module displays a table 402 so the user can see what aspects of the ABIE 310 can be used only in specific contexts. The table 402 is aligned with the BBIEs in the ABIE. The table 402 includes column headings 404 corresponding to the input areas of the GUI 200. Moreover, the user's current entry in the GUI 200 is presented for each of the column headings, such as Consumer Products for the Industry Classification category and the wildcard character for the Official Constraints category.

The ABIE 310 and its respective elements have separate rows in the table 402. Thus, a "BP" mark 406 in the Business Process: Purchasing column indicates that the ABIE is usable only in a specific business process. An "SC" mark 408 in the System Constraints: SAP R/3 column here indicates that the corresponding BBIEs are usable only in specific systems. The marks in the other columns have corresponding significance for these or other BBIEs. Also, an empty row 409 in the table 402 indicates that the associated ABIE or BBIE is usable in all contexts. This corresponds to the ABIE or BBIE not having the context-specificity icon 324.

The user can select, in a checkbox column 410, one or more of the BBIEs or the ABIE for further editing. A Change control 412 lets the user change aspects of the selected BBIE or ABIE. A Delete control 414 lets the user delete the selected BBIE or ABIE. Such modifications affect the entity that is stored in the building block repository 118. Moreover, the modifications apply only to the context in which they are created. Thus, the editing module lets the user change or delete a BBIE or an ABIE for any context specified in the GUI 200.

Figure 5:
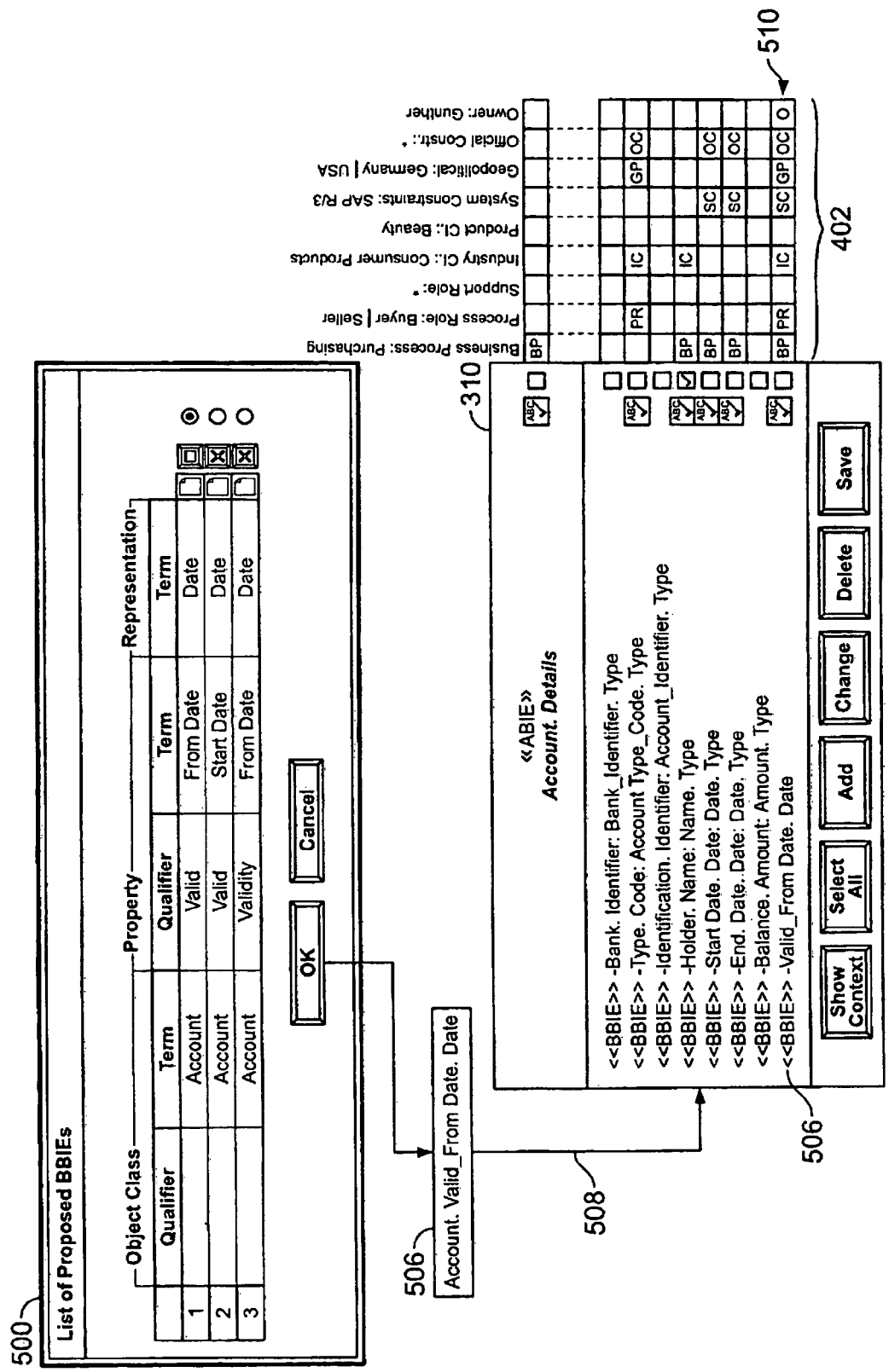
FIG. 5 schematically illustrates addition of a data element to the data component being edited in FIG. 4.

An Add control 416 provides that the user can add one or more BBIEs to the ABIE being edited. FIG. 5 shows that upon the user selecting this control, a BBIE selection GUI 500 is displayed. The GUI lists one or more proposed BBIEs that can be added to the ABIE being edited. Because the BBIE being edited here is an "Account. Details" BBIE, the GUI 500 proposes BBIEs where the value of a term 502 equals "Account". In a selection area 504, the user here selects a BBIE 506 among the proposed BBIEs. The editing module provides the BBIE 506 to the BBIE 310 as indicated by an arrow 508, where the BBIE is added to the list of BBIEs for the ABIE. The editing module also updates the table 402 with a row 510 that corresponds to context information for the BBIE 506. Particularly, the row 510 includes marks in several columns, indicating that the BBIE 506 is limited to specific contexts in these particular categories.

The BBIE or ASBIE that the user wants to add may already exist in another context. The BBMM 112 may therefore, upon receiving an addition request, first determine whether the sought component already exists. If so, the BBMM may simply add the now-specified context to the existing BBIE or ASBIE. A similar procedure may be used when a BBIE or ASBIE is to be deleted. If the BBIE or ASBIE has already been deleted in another context, the BBMM can simply add the now-specified context to the existing context values.

Figure 6:
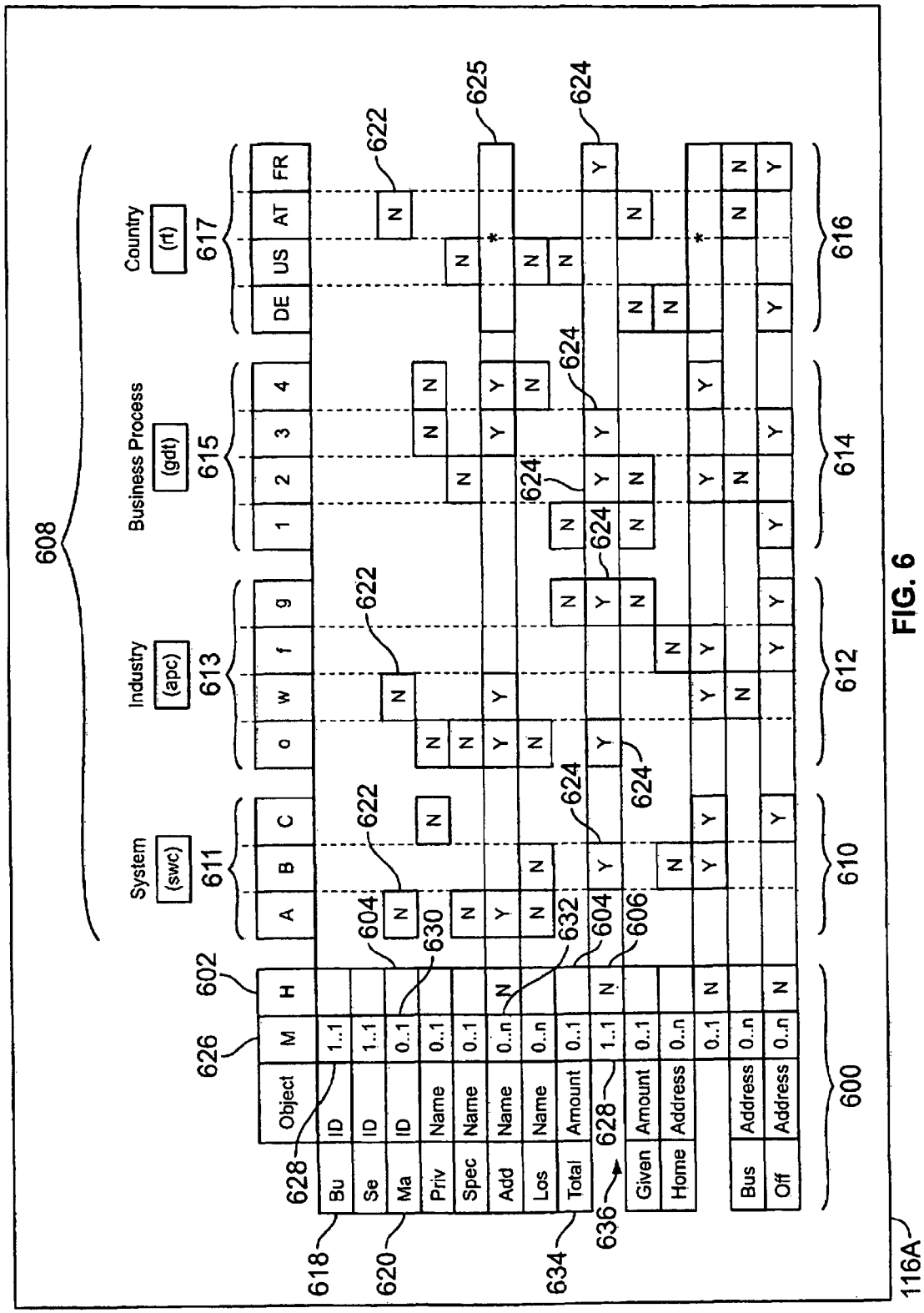
FIG. 6 shows an example of a data type from which data components can be created.

FIG. 6 shows an example of the data type 116A. The data type includes an element column 600 that includes all possible elements that can be included in data components created from this data type in the different contexts. A harmonization column 602 indicates, for each element in the column 600, whether the harmonization indicator (HI) associated with the element is set. An empty position 604 in the harmonization column 602 means that the element is harmonized. That is, the element is usable in all contexts unless explicitly excluded. An "N" entry 606 in the harmonization column means that the element is not harmonized. That is, the element is not usable in any context except those where it is explicitly included.

An area 608 lists context-specific inclusions and exclusions for the various elements. The area 608 may include a column for each context category by which data components and elements are organized, for example the eight CCTS-categories and the Owner category described above. Here, the area 608 includes a System column 610, an Industry column 612, a Business Process column 614 and a Country column 616. Each column is subdivided according to the alternative context values for its category. That is, the System column includes subdivisions 611, the Industry column includes subdivisions 613, the Business Process column includes subdivisions 615 and the Country column includes subdivisions 617. For simplicity, only a few values are shown for each category; thus: A, B or C for System; o, w, f or g for Industry; 1, 2, 3 or 4 for Business Process; and DE, US, AT or FR for Country. Here, the shown values for the last category are examples of real values while the values for the former three are dummy placeholders for real values (for example "SAP R/3" for System and "Consumer Products" for Industry).

If no specific exclusions are made for a harmonized element, as is the case with a Buyer Identifier ("Bu ID") element 618, that element will be usable in all contexts. In contrast, the user can make an "N" entry in any of the columns 610-616 to exclude a harmonized element from such a context. The names of BBIEs and ASBIEs have been shortened for clarity. In actual implementations, they may comply with the naming conventions of the CCTS.

For example, in a Manufacturer Identifier ("Ma ID") element 620, the user has made "N" entries 622 in the System, Industry and Country columns. This means that the element 620 will be usable in any context that does not involve System A, Industry w or the Country Austria (AT). The exclusion entries are disjunctive, meaning that they are associated with a Boolean OR. For example, the element 620 is excluded from every context that is characterized by one or more of System A, Industry w or Country Austria. For a non-harmonized element the user can place a "Y" entry 624 in any of the columns to explicitly include the element in a specific context. Such entries are conjunct between different context categories, meaning that they are associated with a Boolean AND. With a "wildcard" entry 625, the element is relevant for all values of the corresponding context category.

A cardinality column 626 indicates a cardinality for each of the elements in the data type. The cardinality defines how the element may or should be used when the element is valid according to the harmonization settings. For example, a "1 . . . 1" entry 628 signifies that there should be one mandatory occurrence of the element. A "0 . . . 1" entry 630 indicates one optional occurrence. A "0 . . . n" entry 632 indicates optional occurrence with unlimited repeating. For mandatory occurrence with unlimited repeating, a "1 . . . n" entry can be used. The "0 . . . n" and "1 . . . n" entries can be converted to limited repeating by replacing the letter "n" with a specific number.

A harmonized element can have an unharmonized extension. For example, a Total Amount element 634 is harmonized according to its empty position 604 in the harmonization column. According to its cardinality, the element 634 optionally is used once. An extension element 636 of the element 634 can be created. The extension element 636 has the "N" entry 606 and is therefore non-harmonized. The non-harmonized extension element mandatory occurs once, according to its "1 . . . 1" entry 628. Moreover, the extension element is limited to one of the specific contexts as specified in the area 608. That is, the extension element 636 is defined to occur only in the context characterized by the values for which the "Y" entry 624 is made. Here, that context includes System B, Industry o or g, Business Process 2 or 3, and Country France (FR). As another example, a harmonized optional element can have a context-specific optional extension.

FIGS. 7, 8 and 9A-9B show examples of how created data components can be used. The models of the data components are context independent, and a user enters certain context values to create a data component that is a context specific subset thereof, for example in the form of a JAVA class, an ABAP object or an XML Schema. The data component is thereafter included in a software component or an application component. The context specific component may be generated according to specific rules from the context independent CCTS.

Figure 7:
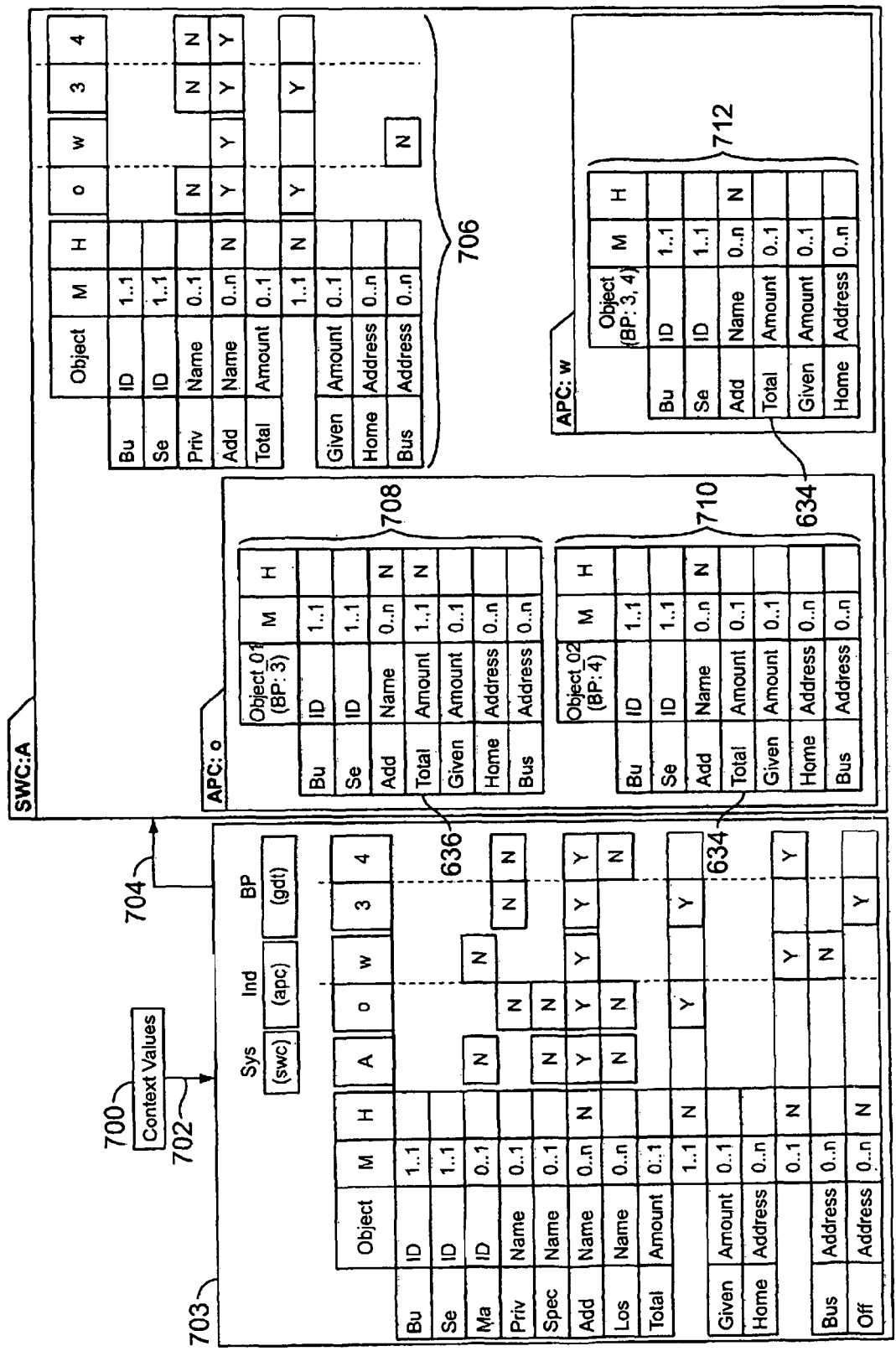
FIGS. 7, 8 and 9A-9B show examples of creating data components from the FIG. 6 data type.

In FIG. 7, the user enters the following context values 700: System A, Industry o or w, Business Process 3 or 4, and a wildcard entry for Country. Here, the System A corresponds to a software component A, and the Industry o and w correspond to application components o and w, respectively. Based on the received user input specifying the context values, the system generates, as indicated by an arrow 702, a context specific subset 703 of the data type 116A. The subset 703 specifies only the entered context values.

The subset 703 can thereafter be used in creating, as indicated by arrow 704, a software-specific data component 706 for the software component A. For example, the software component A relates to a CRM system. Elements of the data type 116A that are not used in the specified context are not present in the data component 706. The harmonization indicators 122 and any explicit inclusions or exclusions are used in determining the elements for the data component. Moreover, from the data component 706 is created application-specific data components 708 and 710 for the application component o, and application-specific data component 712 for application component w. For example, application component o relates to consumer products and application component w to chemical manufacturing. In application component o, the component 708 relates to Business Process 3 and the component 710 to Business Process 4.

The respective application-specific components 708, 710 and 712 include elements that apply for their specific contexts according to data type 116A. In particular, the component 708, and not components 710 or 712, include the mandatory non-harmonized Total Amount extension element 636. The latter components include the harmonized and optional Total Amount element 634.

Figure 8:
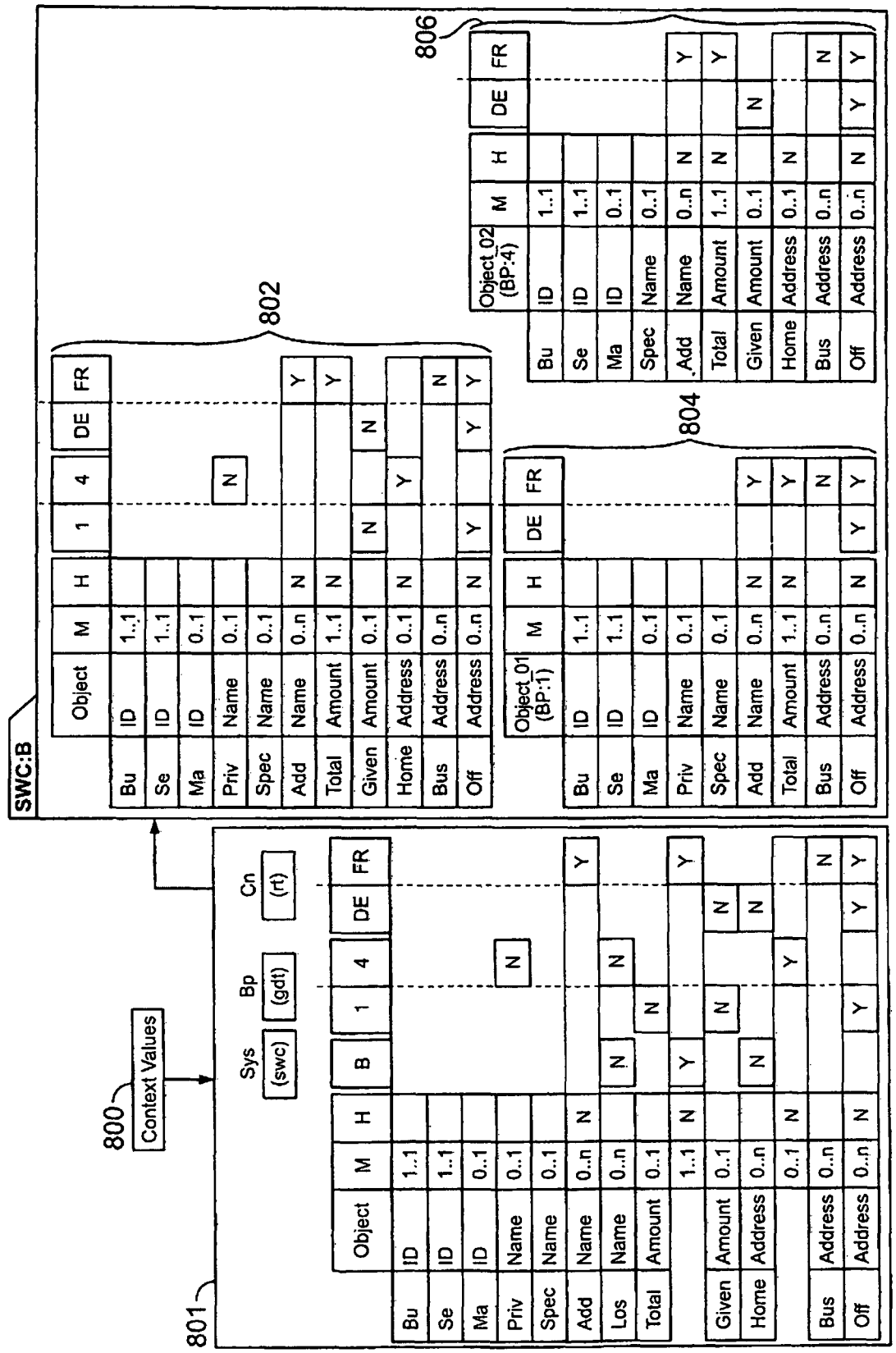

In FIG. 8, a user enters context values 800 which are similarly used in creating a context specific subset 801 of the data type 116A. Here, the context values are: System B, a wildcard entry for the Industry, Business Process 1 or 4, and Country Germany (DE) or France. The context-specific subset is thereafter used in creating software-specific data components 802, 804 and 806 for a software component B. Components 804 and 806 relate to Business Processes 1 and 4, respectively. The harmonization indicators 122 and any explicit inclusions or exclusions are used in determining the elements for the data component.

Figure 9A:
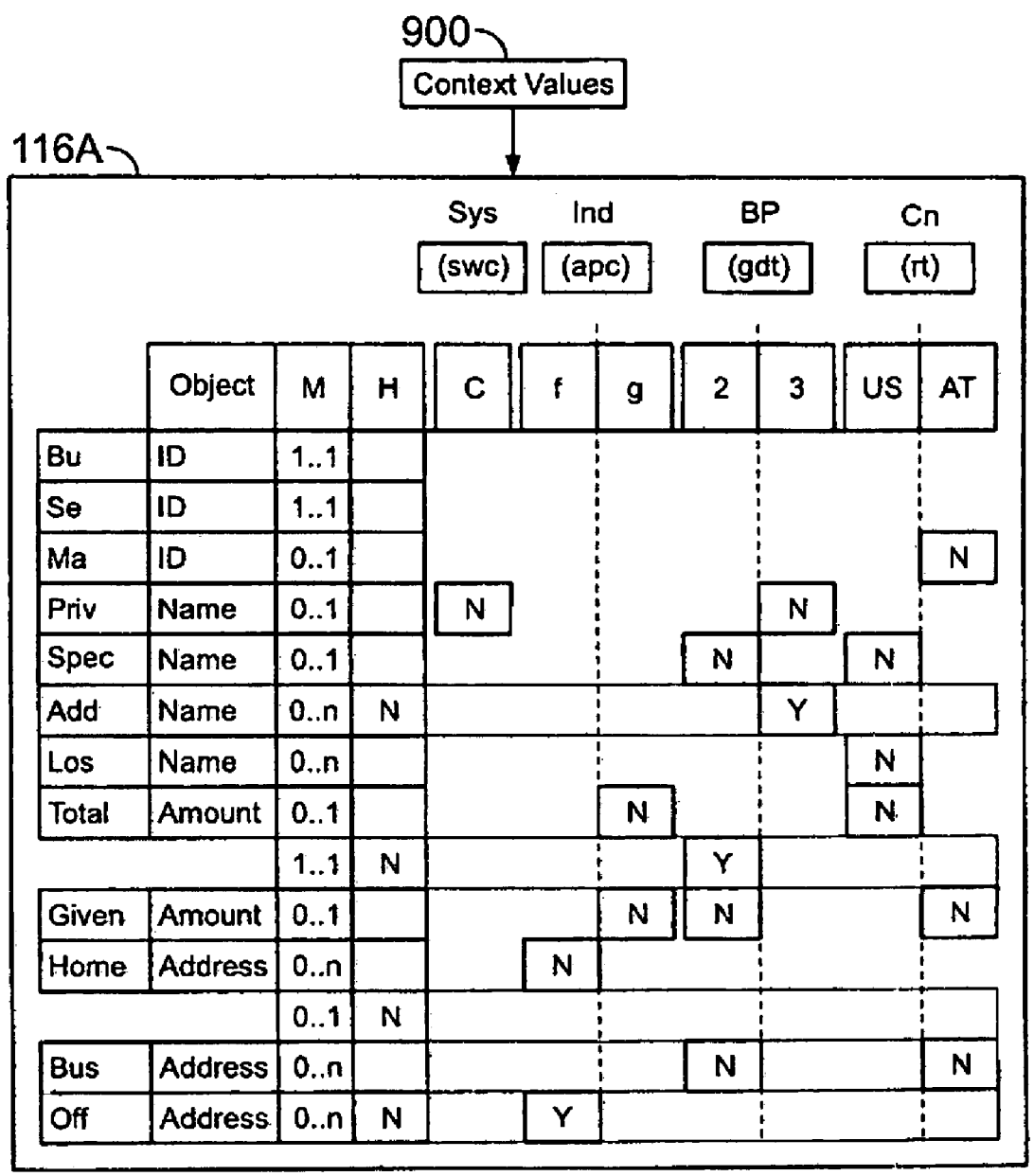
Figure 9B:
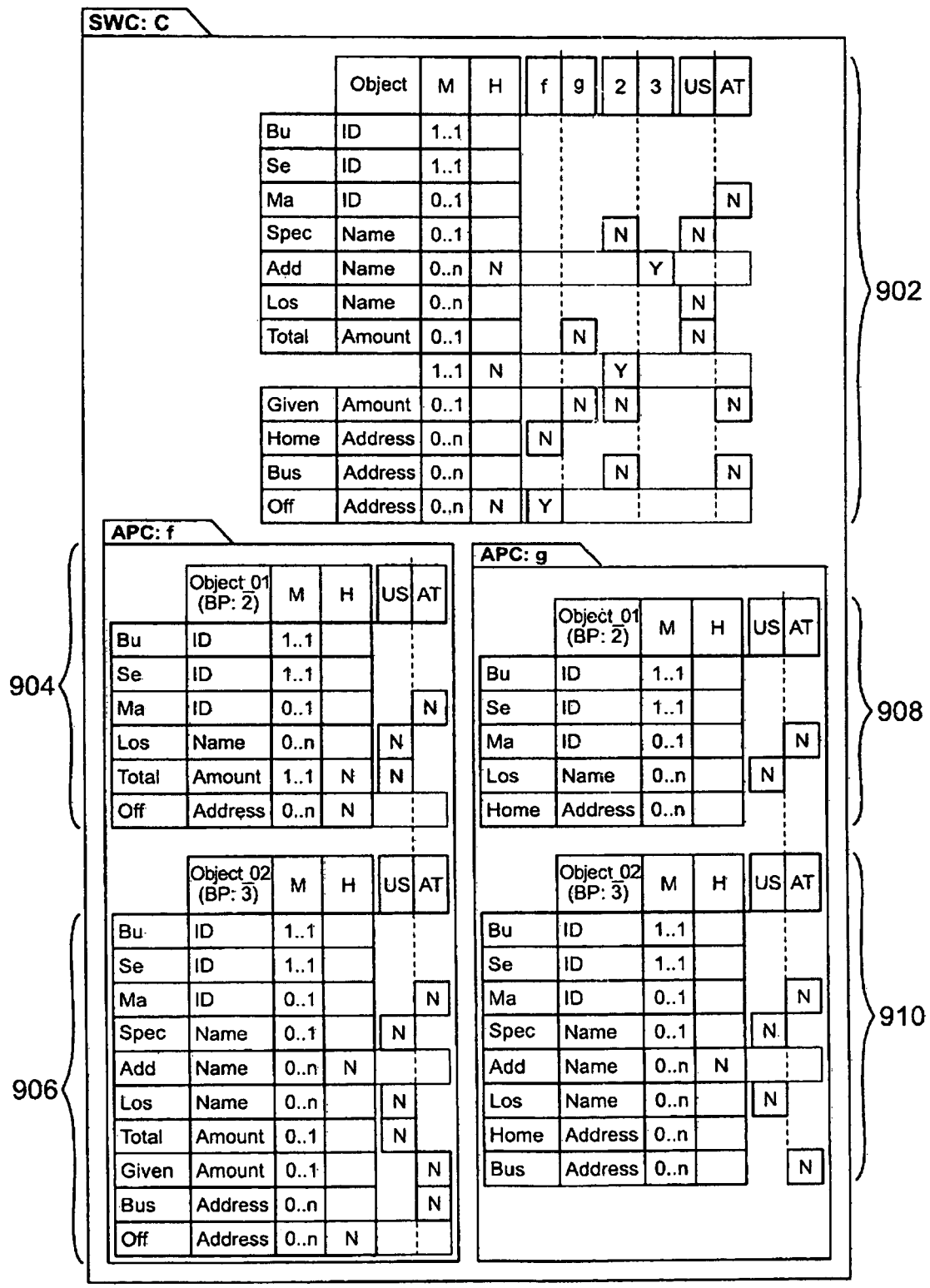

In FIG. 9A, a user enters context values 900 which are similarly used in creating a context specific subset 901 of the data type 116A. Here, the context values are: System C, Industry f or g, Business Process 2 or 3, and Country U.S. or Austria. The subset is thereafter used in creating data components for a software component C shown in FIG. 9B. A software-specific component 902 relates to the software component C in general. An application component f includes an application-specific component 904 (for Business Process 2) and an application-specific component 906 (for Business Process 3). An application component g includes an application-specific component 908 (for Business Process 2) and an application-specific component 910 (for Business Process 3). The components 902-910 include elements that apply for their specific contexts according to data type 116A. The harmonization indicators 122 and any explicit inclusions or exclusions are used in determining the elements for the data component.

Figure 10:
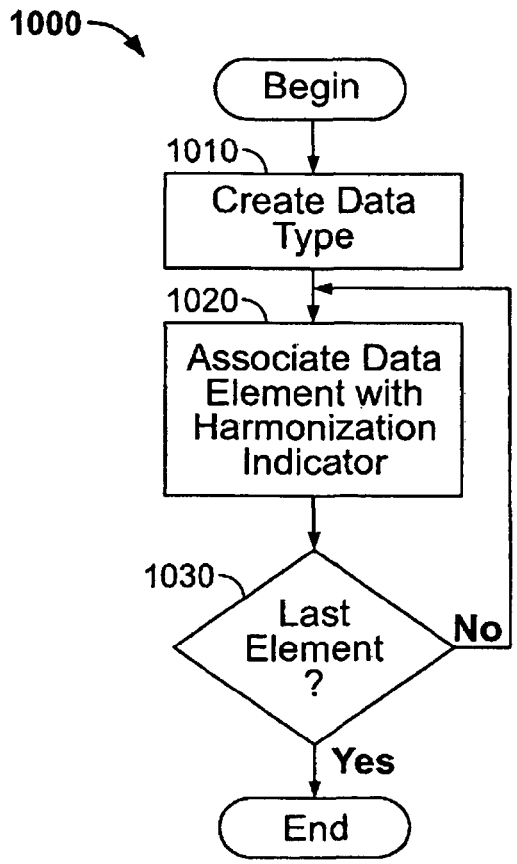
FIGS. 10 and 11 show flow charts of method embodiments.
Figure 11:
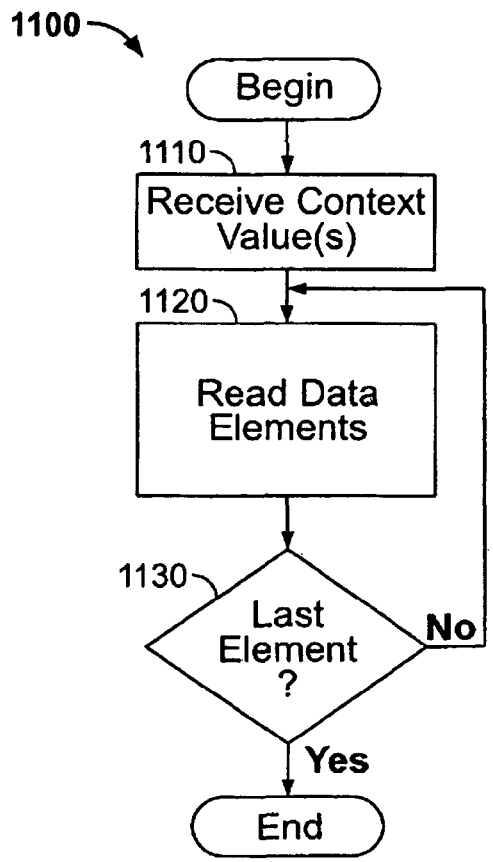

FIG. 10 shows a flow chart of a method 1000 relating to specifying data elements for a data component. FIG. 11 shows a flow chart of a method 1100 relating to creating a data component. Any of the methods may be performed in the systems 102, 104, 106 or 108. A computer program product may include instructions that cause a processor to perform operations comprising the steps of either or both methods. The method 1000 includes the following steps:

Creating, in step 1010, a data type that includes several data elements. The data type is to be context independent and to be used in creating data components for specific contexts. For example, the data type 116A can be created in step 1010.

Associating, in step 1020, one of the data elements with a HI. When the HI is set, it causes the associated data element to be included in the data components for any of the specific contexts unless explicitly excluded. When the HI is not set, it causes the associated data element not to be included in the data components for any of the specific contexts unless explicitly included. For example, the harmonization column 602 may reflect the setting of the HI for different elements. Decision step 1030 ensures that the step 1020 is performed for each element in the data type.

The method 1100 includes the following steps:

Receiving, in step 1110, a user input specifying at least one context value. The user input is made for performing a predefined operation on a data component for a specific context characterized by the at lest one context value. The data component is a context specific representation of a context independent data type. For example, the user input can be received through the GUI 200.

Reading, in step 1120, data elements of the data type in response to the user input. Each of the data elements is associated with a HI that guides performance of the predefined operation. When set, the HI causes the associated data element to be included in performing the predefined operation unless the element has been explicitly excluded. When the HI is not set, the element is not included in the predefined operation unless the element has been explicitly included. Decision step 1130 ensures that the step 1120 is performed for each element in the data type. For example, the method 1100 can be performed upon a user entering specific context data in the GUI 200 for the purpose of finding a certain data component to be used, modified or deleted.

Figure 12:
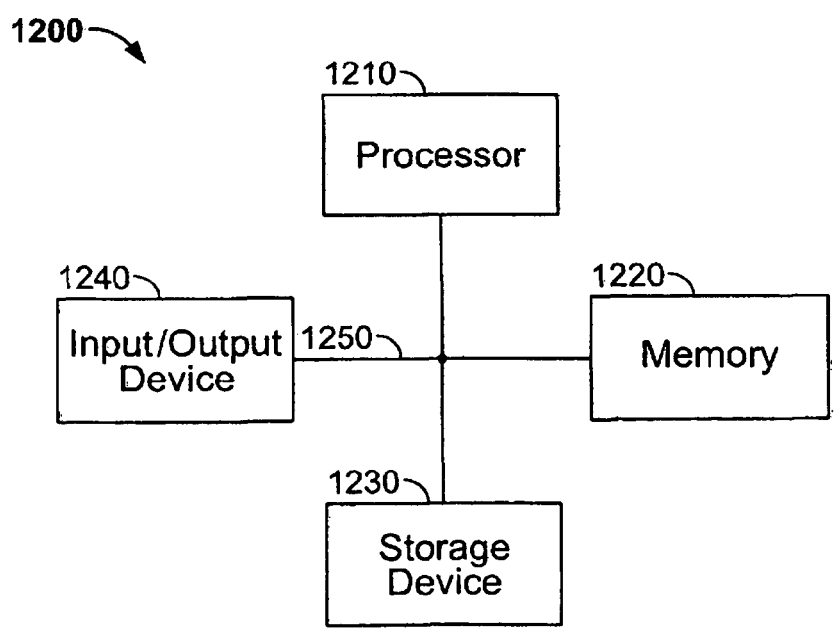
FIG. 12 is a block diagram of a general computer system.

FIG. 12 is a block diagram of a computer system 1200 that can be used in the operations described above, for example in any or all of the participants of the environment 100. The system 1200 includes a processor 1210, a memory 1220, a storage device 1230 and an input/output device 1240. Each of the components 1210, 1220, 1230 and 1240 are interconnected using a system bus 1250. The processor 1210 is capable of processing instructions for execution within the system 1200. In one embodiment, the processor 1210 is a single-threaded processor. In another embodiment, the processor 1210 is a multi-threaded processor. The processor 1210 is capable of processing instructions stored in the memory 1220 or on the storage device 1230 to display graphical information for a user interface on the input/output device 1240.

The memory 1220 stores information within the system 1200. In one embodiment, the memory 1220 is a computer-readable medium. In one embodiment, the memory 1220 is a volatile memory unit. In another embodiment, the memory 1220 is a non-volatile memory unit.

The storage device 1230 is capable of providing mass storage for the system 1200. In one embodiment, the storage device 1230 is a computer-readable medium. In various different embodiments, the storage device 1230 may be a floppy disk device, a hard disk device, an optical disk device, or a tape device. For example, the master repository 114 and the building block repository 118 can be stored on the storage device 1230.

The input/output device 1240 provides input/output operations for the system 1200. In one embodiment, the input/output device 1240 includes a keyboard and/or pointing device. In one embodiment, the input/output device 1240 includes a display unit for displaying graphical user interfaces. For example, the input/output device can generate the GUI 200, the editing module 400, and the GUI 500.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of performing a predefined operation on a data component for a specific context, the method comprising:
   receiving a user input specifying at least one context value, the user input being made for performing a predefined operation on a data component for a specific context characterized by the at least one context value, the data component being a context specific representation of a context independent data type;
   reading data elements of the context independent data type in response to the user input, each of the data elements being (1) configured for defining semantics of data in a document that is electronically transmitted between entities and (2) associated with a harmonization indicator that, when set, causes the associated data element to be included in performing the predefined operation unless the context independent data type explicitly excludes the associated data element for the specific context, and that, when not set, causes the associated data element not to be included in performing the predefined operation unless the context independent data type explicitly includes the associated data element for the specific context; and
   performing the predefined operation on the data component based at least in part on a setting of the harmonization indicator of each of the data elements.

2. The computer-implemented method of claim 1, wherein the predefined operation comprises creating the data component for inclusion in a software component for the specific context.

3. The computer-implemented method of claim 2, wherein the software component includes at least one application component, and wherein the data component is modified to be included in the at least one application component.

4. The computer-implemented method of claim 2, further comprising assigning a name for the data component based on the context independent data type.

5. The computer-implemented method of claim 4, wherein assigning the name comprises taking into account a name space of the software component.

6. The computer-implemented method of claim 2, further comprising storing the data component in a searchable repository of several data components, and providing an editing module for a user to create an edited data component from any of the several data components, the edited data component being permitted only in a context in which it is created.

7. The computer-implemented method of claim 6, wherein the editing module identifies to the user the context in which the edited data component is created.

8. The computer-implemented method of claim 6, wherein the editing module displays to the user a context-specificity icon associated with at least one data element in the data component being edited, the context-specificity icon indicating whether the data element is included in all contexts.

9. The computer-implemented method of claim 6, wherein the edited data component is formed by adding to the at least one data component a new data element that the context independent data type does not contain.

10. The computer-implemented method of claim 9, further comprising identifying another data component that includes the new data element and that is created in a different context than the edited data component, the other data component being identified to aid a decision whether to harmonize the new data element.

11. The computer-implemented method of claim 2, wherein the data component already exists in another context, further comprising adding the at least one context value specified in the user input to the existing data component.

12. The computer-implemented method of claim 1, wherein the predefined operation comprises deleting the data component for the specific context.

13. The computer-implemented method of claim 12, wherein the data component already has been deleted in another context, further comprising adding the at least one context value specified in the user input to the already deleted data component.

14. A computer program product tangibly embodied in a computer-readable storage medium, the computer program product including instructions that, when executed, cause a processor to perform operations comprising:

receiving a user input specifying at least one context value, the user input being made to obtain a data component for a specific context characterized by the at least one context value; and creating the data component from a data type including several data elements configured for defining semantics of data in a document that is electronically transmitted between entities, the data type having associated with each of the several data elements a harmonization indicator that, when set, causes the associated data element to be included in the data component unless the data type explicitly excludes the associated data element for the specific context, and that, when not set, causes the associated data element not to be included in the data component unless the data type explicitly includes the associated data element for the specific context.

15. A computer-implemented method of creating a data component for a specific context to identify semantics of information exchanged in the specific context, the method comprising:

receiving a user input specifying multiple context values associated with respective context categories defined in a standard, the user input being made for creating a data component for a specific context characterized by the multiple context values, the data component configured for use according to the standard to identify semantics of information being exchanged;

reading contents of a context independent data type in response to the user input, the context independent data type including data elements each (1) configured for defining semantics of data in a document that is electronically transmitted between entities and (2) associated with a harmonization indicator that, when set, causes the associated data element to be included in the data component being created unless the context independent data type explicitly excludes the associated data element for the specific context, and that, when not set, causes the associated data element not to be included in the data component being created unless the context independent data type explicitly includes the associated data element for the specific context;

selecting (1) any of the data elements in the context independent data type whose harmonization indicator is set and that has not been explicitly excluded for the specific context, and (2) any of the data elements in the context independent data type whose harmonization indicator is not set and that has been explicitly included for the specific context; and creating the data component as a context specific representation of the context independent data type, the created data component including each selected data element.

16. A computer-implemented method of creating a business information entity according to Core Components Technical Specification (CCTS) for a specific context defined using context categories of the CCTS, to identify semantics of information exchanged in the specific context, the method comprising:

receiving a user input generated using a graphical user interface having input areas relating to the context categories of the CCTS, the user input specifying multiple context values each associated with one of the context categories and being made for creating a business information entity compliant with the CCTS for a specific context characterized by the multiple context values, the business information entity configured for use according to the CCTS to identify semantics of information being exchanged, wherein the user input includes at least first and second context values associated with a common one of the context categories;

reading contents of a context independent data type in response to the user input, the context independent data type including data elements configured to identify respective semantics of information being exchanged, each of the data elements associated with a harmonization indicator that, when set, causes the associated data element to be included in the business information entity being created unless the context independent data type explicitly excludes the associated data element for the specific context, and that, when not set, causes the associated data element not to be included in the business information entity being created unless the context independent data type explicitly includes the associated data element for the specific context, the context independent data type including a setting of each of the harmonization indicators;

selecting (1) any of the data elements in the context independent data type whose harmonization indicator is set and that per the setting in the context independent data type has not been explicitly excluded for the specific context, and (2) any of the data elements in the context independent data type whose harmonization indicator is not set and that per the setting in the context independent data type has been explicitly included for the specific context; and creating the business information entity as one of a basic business information entity, an aggregate business information entity and an association business information entity according to the CCTS, the created business information entity being a context specific representation of the context independent data type and including each data element selected from the context independent data type, wherein the created business information entity is configured for use in creating at least first and second specific business information entities associated with the first and second context values, respectively.

* * * * *